(12) United States Patent
Sasaki et al.

(10) Patent No.: US 9,726,138 B2
(45) Date of Patent: Aug. 8, 2017

(54) ENGINE STARTER

(71) Applicant: Mitsubishi Electric Corporation, Chiyoda-ku, Tokyo (JP)

(72) Inventors: Yoshihiro Sasaki, Chiyoda-ku (JP); Daisuke Mizuno, Chiyoda-ku (JP); Hiroaki Kitano, Chiyoda-ku (JP); Koichiro Kamei, Chiyoda-ku (JP); Kazuhiro Odahara, Chiyoda-ku (JP); Takenobu Matsubara, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 14/338,424

(22) Filed: Jul. 23, 2014

(65) Prior Publication Data

US 2015/0260144 A1 Sep. 17, 2015

(30) Foreign Application Priority Data

Mar. 12, 2014 (JP) ................................. 2014-048354

(51) Int. Cl.
*F02N 15/02* (2006.01)
*F16D 7/02* (2006.01)
(Continued)

(52) U.S. Cl.
CPC ......... *F02N 15/023* (2013.01); *F02N 15/062* (2013.01); *F16D 7/025* (2013.01);
(Continued)

(58) Field of Classification Search
CPC ...... F02N 15/023; F02N 15/067; F02N 15/02; F02N 15/021; F02N 15/022;
(Continued)

(56) References Cited

U.S. PATENT DOCUMENTS 2,235,076 A * 3/1941 McGrath ............... F02N 15/062
74/6
2,333,765 A * 11/1943 Celio .................... F02N 15/066
290/38 A
(Continued)

FOREIGN PATENT DOCUMENTS

CN 1464943 A 12/2003
CN 103038496 A 4/2013
(Continued)

OTHER PUBLICATIONS

Communication dated Mar. 24, 2015 from the Japanese Patent Office in counterpart Application No. 2014-048354.
(Continued)

*Primary Examiner* — Victor MacArthur
*Assistant Examiner* — Leonard J Archuleta
(74) *Attorney, Agent, or Firm* — Sughrue Mion, PLLC; Richard C. Turner

(57) ABSTRACT

The engine starter includes a pinion-mobile component which is linked to an output shaft by a helical spline and can be slid in a shaft direction, in a state where the pinion-mobile component includes; an overrunning clutch which is idled when the pinion gear, which is engaged to the ring gear, is driven by the engine via the ring gear so as to be rotated at a rotational speed which is higher than a rotational speed of the output shaft; and a breaking mechanism in which the overrunning clutch breaks a transmission of a torque, which is generated in accordance with a rotation of the motor and is transmitted to the ring gear, when a value of the torque is a predetermined condition value with respect to a direction where the torque is transmitted to the ring gear.

3 Claims, 8 Drawing Sheets

(51) Int. Cl.
  *F02N 15/06* (2006.01)
  *F02N 15/04* (2006.01)
  *F16D 41/066* (2006.01)
  *F16D 47/02* (2006.01)

(52) U.S. Cl.
  CPC .......... *F02N 15/043* (2013.01); *F02N 15/067* (2013.01); *F16D 41/066* (2013.01); *F16D 47/02* (2013.01); *Y10T 74/134* (2015.01)

(58) Field of Classification Search
  CPC .... F02N 15/026; F02N 15/028; F02N 15/043; F02N 15/062; F02N 15/063; F16D 7/024; F16D 7/04; F16D 7/042; F16D 7/044; Y10T 74/134
  USPC ................. 74/7 A, 7 C, 7 E, 7 R; 123/179.3; 192/104 R, 45.1, 48.3, 48.92; 310/78; 464/38, 47; 290/48; 475/153, 2, 263, 475/347
  See application file for complete search history.

(56) References Cited

U.S. PATENT DOCUMENTS

| | | | | | |
|---|---|---|---|---|---|
| 2,554,445 | A * | 5/1951 | Miller | ............ | F02N 15/026 192/104 R |
| 3,114,270 | A * | 12/1963 | Buxton | ............ | F02N 15/028 192/42 |
| 3,741,021 | A * | 6/1973 | Parsons | ............ | F02N 15/06 74/7 R |
| 3,851,532 | A * | 12/1974 | Pfluger | ............ | F02N 15/025 192/104 R |
| 4,062,203 | A * | 12/1977 | Leonard et al. | ............ | 464/38 |
| 4,114,746 | A * | 9/1978 | Usui et al. | ............ | 192/104 R |
| 4,308,462 | A * | 12/1981 | McMillen | ............ | F02N 15/00 290/38 R |
| 4,325,265 | A * | 4/1982 | Wakatsuki | ............ | F02N 11/00 192/114 R |
| 4,346,615 | A * | 8/1982 | Yoneda | ............ | F02N 15/06 192/114 R |
| 4,524,629 | A * | 6/1985 | Digby | ............ | F02N 15/065 74/7 R |
| 4,528,470 | A * | 7/1985 | Young et al. | ............ | 310/78 |
| 4,627,299 | A * | 12/1986 | Mortensen, Sr. | ............ | F02N 15/065 74/7 A |
| 4,785,679 | A * | 11/1988 | Weber | ............ | F02N 11/14 74/7 R |
| 4,883,152 | A * | 11/1989 | Froment | ............ | F02N 15/023 192/41 R |
| 5,050,441 | A * | 9/1991 | Giometti | ............ | F02N 15/026 192/104 R |
| 5,237,882 | A * | 8/1993 | Giometti | ............ | F02N 15/063 192/103 A |
| 6,237,432 | B1 * | 5/2001 | Vilou | ............ | F02N 15/025 192/66.22 |
| 6,763,735 | B2 * | 7/2004 | Siems | ............ | F02N 15/062 123/179.25 |
| 6,948,392 | B2 * | 9/2005 | Eckard | ............ | F02N 5/04 192/55.1 |
| 7,677,123 | B2 * | 3/2010 | Nawa | ............ | F02N 15/046 192/56.61 |
| 2004/0020315 | A1 * | 2/2004 | Vilou | ............ | H01H 51/065 74/7 A |
| 2005/0076727 | A1 * | 4/2005 | Hasegawa et al. | ............ | 74/7 E |
| 2008/0087134 | A1 * | 4/2008 | Nawa | ............ | 74/7 E |
| 2010/0269631 | A1 | 10/2010 | Niimi et al. | | |
| 2012/0029797 | A1 | 2/2012 | Notani | | |
| 2012/0103743 | A1 | 5/2012 | Hong | | |
| 2013/0147207 | A1 * | 6/2013 | Metral | ............ | F02N 15/025 290/38 E |

FOREIGN PATENT DOCUMENTS

| | | |
|---|---|---|
| JP | 3310305 B | 11/1958 |
| JP | 56125543 U | 9/1981 |
| JP | 5927332 U | 2/1984 |
| JP | 241730 U | 3/1990 |
| JP | 10252857 A | 9/1998 |
| JP | 2002321540 A | 11/2002 |
| JP | 2006348804 A | 12/2006 |
| JP | 2012-031819 A | 2/2012 |
| JP | 2012531562 A | 12/2012 |
| JP | 5272879 B2 | 8/2013 |
| JP | 2013532794 A | 8/2013 |

OTHER PUBLICATIONS

Communication dated Nov. 4, 2015 from the Japanese Patent Office in counterpart application No. 2014-048354.
Communication dated Oct. 8, 2015 from the German Patent Office in counterpart application No. 10 2014 217 065.6.
Communication dated Jan. 19, 2016 from the Japanese Patent Office in counterpart application No. 2014-048354.
Communication dated Jun. 20, 2016 from the State Intellectual Property Office of the P.R.C. in counterpart Application No. 201410436191.6.

* cited by examiner

ENGINE STARTER

BACKGROUND OF THE INVENTION

Technical Field

The present invention relates to an engine starter for starting an engine.

Background Art

In a conventional engine starter for starting an engine, the engine starter starts the engine in a state where the engine is stopped. Therefore, a pinion gear provided in the engine starter is engaged to a ring gear in a state where the ring gear provided in the engine starter is not rotated. However, in a recent system in which an idling operation is stopped in order to reduce a fuel cost, there has been a case in which the pinion gear is engaged to the ring gear, even when the ring gear is rotated, in order to ensure a restart capability of the engine.

For example, when the idling operation is just stopped and a restart requirement is inputted in a state where the engine is not stopped yet, or when it is required that an operation time is reduced in a state where a stopping mode of the engine is shifted to a restarting mode, the ring gear is previously engaged to the pinion gear while the ring gear is rotated. In this case, in order to engage the pinion gear to the ring gear while the ring gear is rotated, there has been a method in which the pinion gear is pushed, and the pinion gear is engaged to the ring gear when a difference between the number of revolutions of the pinion gear and the number of revolutions of the ring gear is less than a predetermined value.

Moreover, there has been a possibility in which a large impact is caused when the engine is reversely rotated and the pinion gear is engaged to the ring gear. Therefore, there has been a submitted engine starter in which the rotation-start timing of a motor provided in the engine starter is delayed by using a switch which can perform a control operation by which the rotation-start timing of the motor is delayed, and the impact is avoided by avoiding the engagement of the pinion gear and the ring gear when the engine is reversely rotated (for example, refer to Patent Document 1).

Moreover, there has been a submitted engine starter in which an impact attenuator is provided on a reduction mechanism of the engine starter in order to absorb an impact caused by an engagement of a pinion gear and a ring gear, whereby the impact caused by the engagement of the pinion gear and the ring gear is absorbed (for example, refer to Patent Document 2).

CONVENTIONAL ART DOCUMENT

Patent Document

[Patent Document 1]
  Japanese Laid-Open Patent Publication No. 2012-031819
[Patent Document 2]
  Japanese Patent Publication No. 5272879

SUMMARY OF THE INVENTION

Problems to be Solved by the Invention

In the above-described conventional engine starter in which an impact attenuator, by which the impact caused by the engagement of the pinion gear and the ring gear is absorbed, is provided on the reduction mechanism, the impact applied to the pinion gear is generated when the torque is transmitted to the ring gear via the overrunning clutch and the helical spline, so that damage is caused on the helical spline or the like. Moreover, an abnormal condition, in which the ring gear or the like is worn-out and deformed in accordance with a large impact torque generated by a reversal rotation of the engine, is caused. As a result, there has been a possibility in which the helical spline, the pinion gear and the like are greatly damaged.

The above-described damage, which is applied to the helical spline or the pinion gear in accordance with the impact torque transmitted from the ring gear side, is caused by the impact torque which is generated when the ring gear is reversely rotated during the idling-stop operation, and is caused even when a key of a car, in which an idling-stop mechanism installed, is turned on or the engine is restarted after the ring gear is completely stopped. In each of the cases, a lock phenomenon is caused, and an abnormal and large impact torque is applied to the helical spline or the pinion gear, whereby the helical spline or the pinion gear is inevitably and greatly damaged in the engine starter in which the conventional impact attenuator is provided as described in Patent Document 2. Moreover, when the lock phenomenon is caused on the pinion gear, and the abnormal and large impact torque is applied to the helical spline or the pinion gear, the component is inevitably and greatly damaged even when the lock phenomenon is caused in a car in which an idling-stop mechanism is not installed.

The present invention has been made to solve the above-described problems and an object of the invention is to provide an engine starter in which gears and mechanisms, which are provided in the engine starter, can be protected when an abnormal torque is applied from a ring gear side to a pinion gear side.

Means for Solving Problems

An engine starter of the present invention includes a motor; a pinion-mobile component that includes a pinion gear, which can be engaged to a ring gear provided at an engine side, and is formed in such a way that the pinion-mobile component is linked to an output shaft of the motor by a helical spline and can be slid in an axis direction of the shaft; and a solenoid switch that includes a pushing mechanism for shifting the pinion-mobile component to a position where the pinion-gear is engaged to the ring gear; and a switch for passing or cutting off an electric current supplied to the motor; wherein the pinion-mobile component includes; an overrunning clutch which is idled when the pinion gear, which is engaged to the ring gear, is driven by the engine via the ring gear so as to be rotated at a rotational speed which is higher than a rotational speed of the output shaft; and a breaking mechanism in which the overrunning clutch breaks a transmission of a torque, which is generated in accordance with a rotation of the motor and is transmitted to the ring gear, when a value of the torque is a predetermined condition value with respect to a direction where the torque is transmitted to the ring gear.

Effects of the Invention

According to the engine starter of the present invention, the engine starter includes a mechanism, at the pinion-mobile component, which breaks a transmission of an abnormal torque, in a direction where the torque is transmitted, when the abnormal torque is caused from the ring gear side, so that a gear and the mechanism in the engine starter can be protected from an abnormal impact.

DETAILED DESCRIPTION OF THE PREFERRED EMBODIMENTS

Embodiment 1

Figure 1:
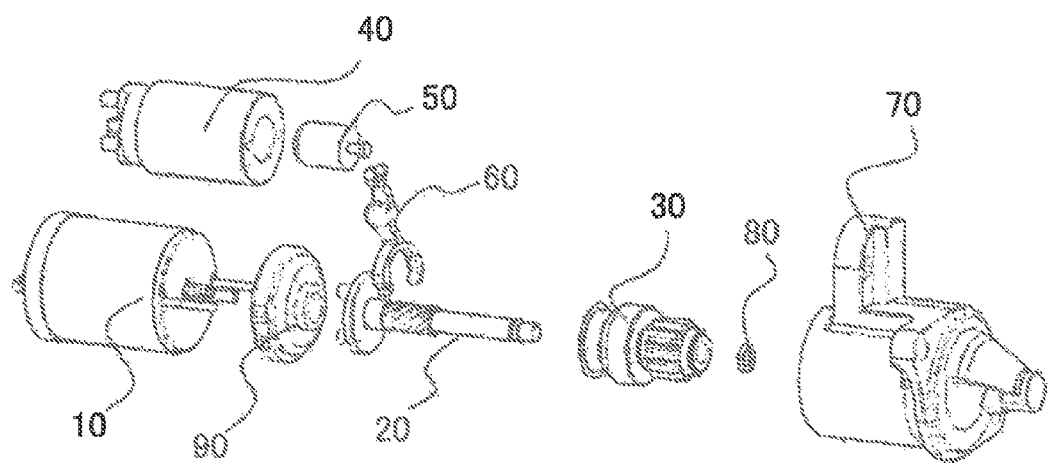
FIG. 1 is an exploded oblique view illustrating an engine starter according to Embodiment 1 of the present invention.

Hereinafter, an engine starter according to Embodiment 1 of the present invention will be minutely explained in reference to the drawings. FIG. 1 is an exploded oblique view illustrating the engine starter according to Embodiment 1 of the present invention. The engine starter according to Embodiment 1 of the present invention is composed of a motor 10, an output shaft 20, a pinion-mobile component 30, a solenoid switch 40, a plunger 50, a lever 60, a bracket 70, a stopper 80, and a reduction gear 90.

The motor 10 generates a rotational power for staring an engine. The output shaft 20 is linked to the motor 10 via the reduction gear 90. The pinion-mobile component 30 is linked to the output shaft 20 by a helical spline, and can be slid on a surface of the output shaft 20 and in a shaft direction of the output shaft 20.

When a key switch of a car is turned on or a turn-on command for the engine stator is decreed from an engine control unit (hereinafter, referred to as ECU), an aspiration coil (described later), which is provided in the engine starter, is energized, and the plunger 50 is aspirated by an operation of the solenoid switch 40. A roughly central portion of the lever 60 is rotatably supported, and one end portion of the lever 60 is engaged to the plunger 50, and moreover, the other end portion of the lever 60 is engaged to the pinion-mobile component 30. When the plunger 50 is aspirated by the aspiration coil so as to be shifted to the solenoid switch 40, one end portion of the lever 60 is shifted with the plunger 50, and the pinion-mobile component 30 is pushed toward an opposite side of the solenoid switch 40. The bracket 70 fixes each of components 13 the motor 10, the output shaft 20, and the pinion-mobile component 30, to the engine side via the stopper 80 which stops the shifting operation of the pinion-mobile component 30 when the pinion-mobile component 30 is shifted to a predetermined position at an opposite side of the motor.

Figure 2:
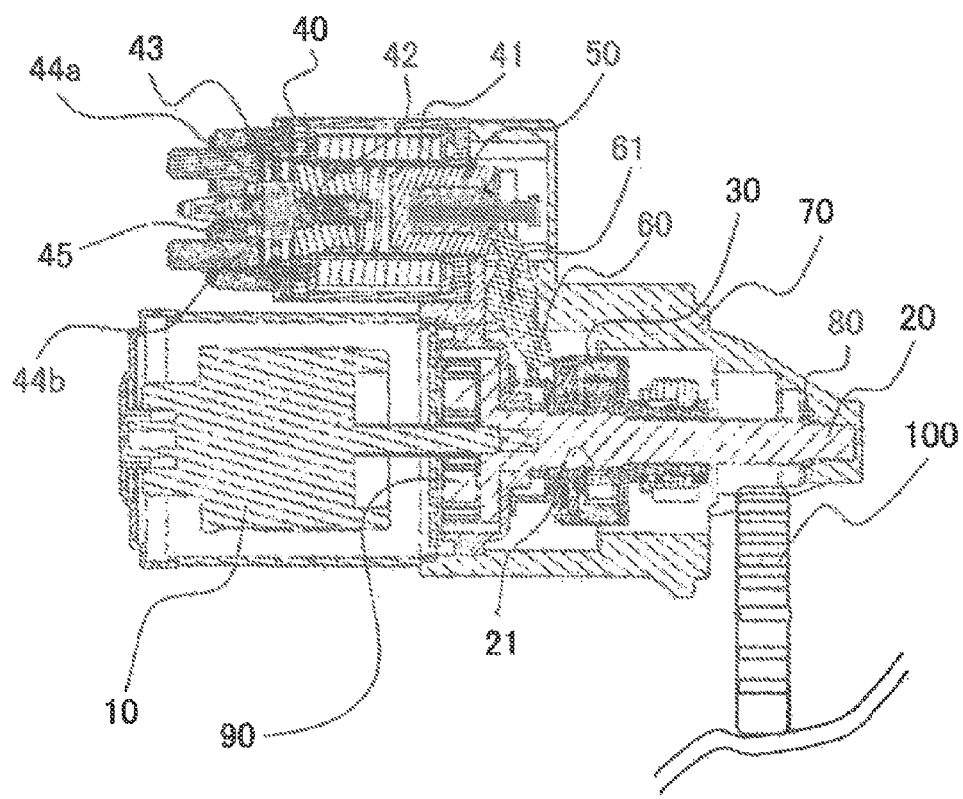
FIG. 2 is a cross-sectional view illustrating the engine starter according to Embodiment 1 of the present invention.

FIG. 2 is a cross-sectional view illustrating the engine starter according to Embodiment 1 of the present invention in a state where the engine starter is installed in the engine. In FIG. 2, when the engine is started, the key switch of the car is turned on, or the turn-on command for the engine stator is decreed from the ECU. Thereby, an electric current is passed through an aspiration coil 41 of the solenoid switch 40, and the plunger 50 is aspirated toward the aspiration coil 41. When the plunger 50 is aspirated toward the aspiration coil 41, one end portion of the lever 60 is pulled toward the solenoid switch 40, and the lever 60 is rotated around a lever-rotational-axis center 61 in a counterclockwise direction in FIG. 2.

When the lever 60 is rotated in the counterclockwise direction, the other end portion of the lever 60 pushes the pinion-mobile component 30 toward a right side in FIG. 2, in other words, an opposite side of the motor 10. As a result, the pinion-mobile component 30, which is linked to the output shaft 20 by a helical spline, is rotated and pushed toward a right side in FIG. 2 along the output-shaft-side-helical spline 21 used as a first helical spline, which is provided on a circumference surface of the output shaft 20. Moreover, the plunger 50 is aspirated by the aspiration coil 41 so as to be contacted to an end portion of a contactor shaft 42, and the contactor shaft 42 presses and pushes a spring 45 toward a left position in FIG. 2. Thereby, a movable contactor 43 bridges a pair of motor contactors 44a and 44b, and the energization of the motor 10 is started, whereby the motor 10 is rotated.

Figure 3:
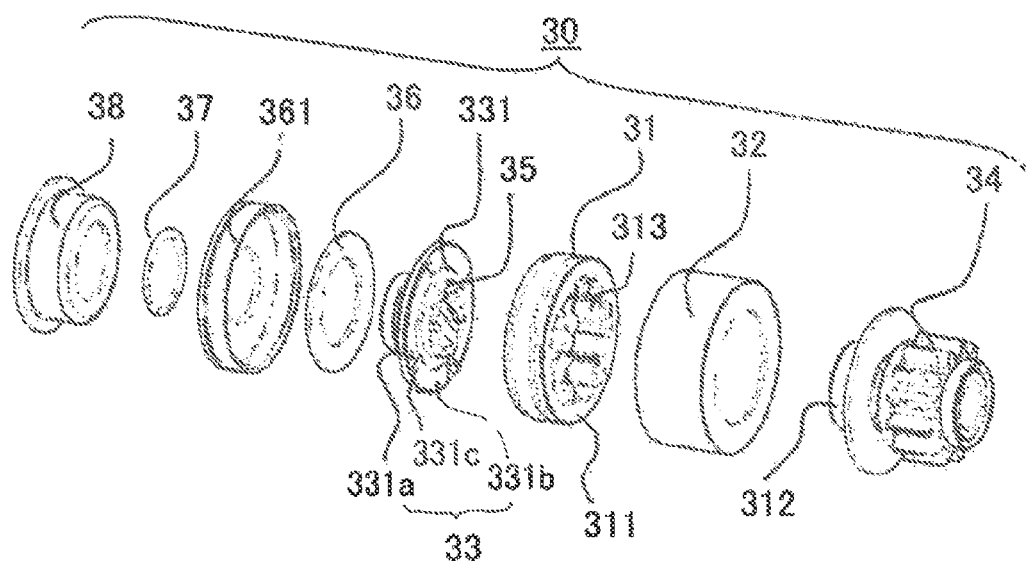
FIG. 3 is an exploded oblique view illustrating a pinion-mobile component of the engine starter according to Embodiment 1 of the present invention.

FIG. 3 is an exploded oblique view illustrating a pinion-mobile component of the engine starter according to Embodiment 1 of the present invention. In FIG. 3, the pinion-mobile component 30 is composed of an overrunning clutch 31, which is idled when a pinion gear 34 engaged to a ring gear 100 is rotated and the number of revolutions of the pinion gear 34 exceeds the number of revolutions of the output shaft 20, a clutch cover 32, a breaking mechanism 33, which breaks a transmission of a torque generated in accordance with a rotation of the motor when the torque is set in a predetermined condition (described later) with respect to a direction where the torque is transmitted, a pinion gear 34, a pinion-mobile-side-helical spline 35 used as a second helical spline which is provided in the pinion-mobile component 30, a lever-engagement component 38 engaged to the lever 60, and a fixing component 37 of the lever-engagement component 37 for fixing the lever-engagement component 38. The pinion-mobile-side-helical spline 35 is engaged to an output-shaft-side-helical spline 21.

Figure 13:
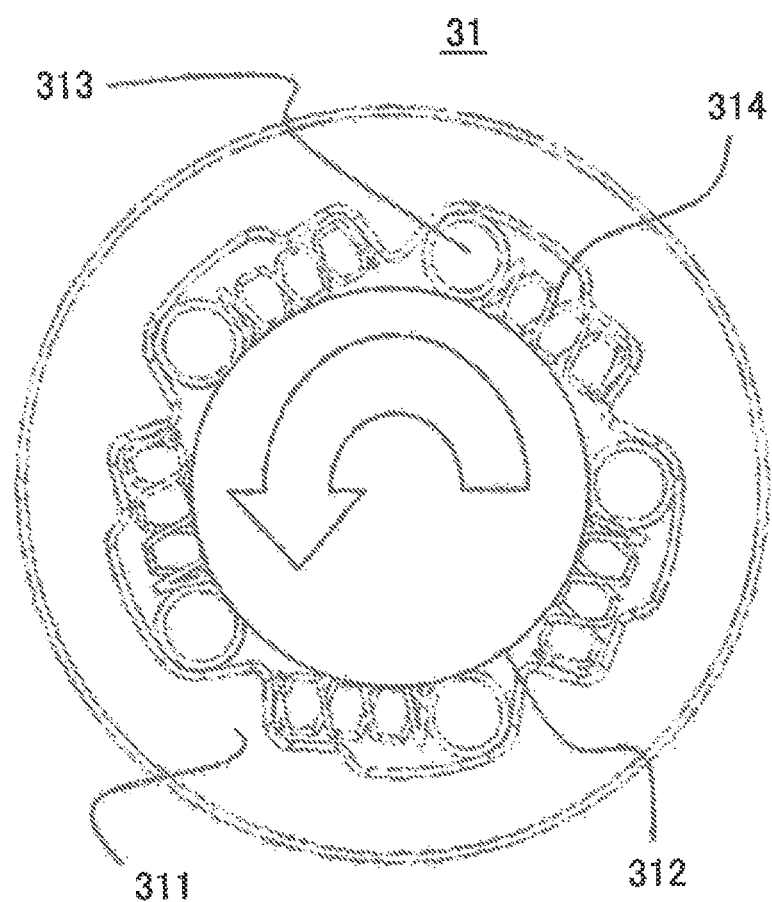
FIG. 13 is a configuration view illustrating an overrunning-clutch component of the engine starter according to Embodiment 1 and Embodiment 2 of the present invention.

FIG. 13 is a configuration view illustrating an overrunning-clutch component of the engine starter according to Embodiment 1 and Embodiment 2 (described later) of the present invention. As illustrated in FIG. 13, the overrunning clutch 31 is composed of a clutch-outer portion 311, a clutch-inner portion 312, a clutch roller 313, and a clutch spring 314 for pressing and energizing the clutch roller 313.

Figure 4:
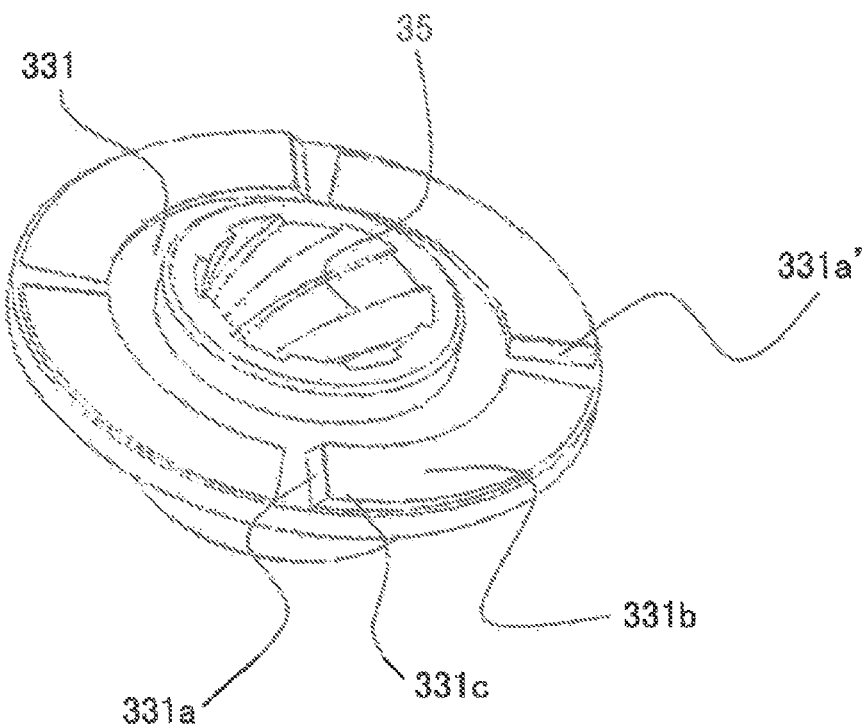
FIG. 4 is an oblique perspective view illustrating an output-shaft-side-transmission component the engine starter according to Embodiment 1 of the present invention.
Figure 5:
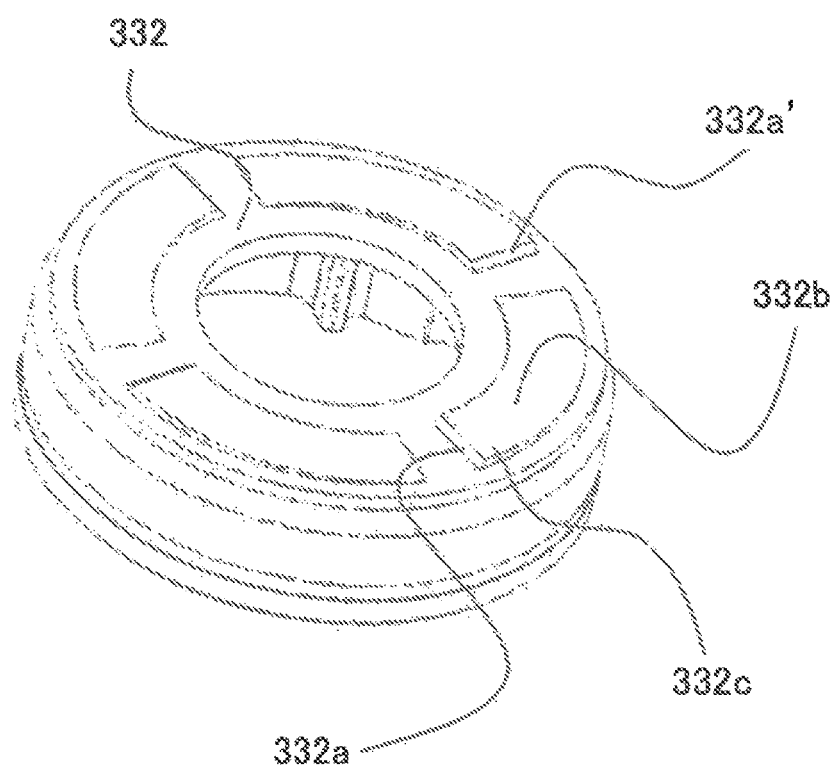
FIG. 5 is an oblique perspective view illustrating a pinion-gear-side-transmission component the engine starter according to Embodiment 1 of the present invention.
Figure 6:
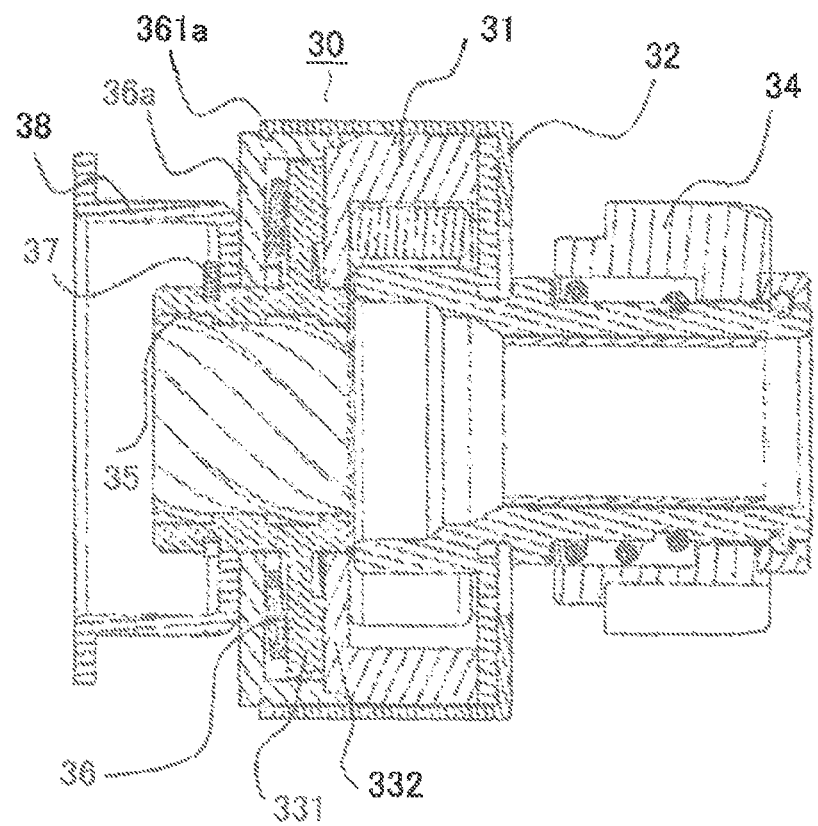
FIG. 6 is a cross-sectional view illustrating the pinion-mobile component of the engine starter according to Embodiment 1 of the present invention.

FIG. 4 is an oblique perspective view illustrating an output-shaft-side-transmission component the engine starter according to Embodiment 1 of the present invention, FIG. 5 is an oblique perspective view illustrating a pinion-gear-side-transmission component the engine starter according to Embodiment 1 of the present invention, and FIG. 6 is a cross-sectional view illustrating the pinion-mobile component of the engine starter according to Embodiment 1 of the present invention. The breaking mechanism 33 is composed of an output-shaft-side-transmission component 331 used as a first transmission component indicated in FIG. 4, a pinion-gear-side-transmission component 332 used as a second transmission component indicated in FIG. 5, a plate spring 36 indicated in FIG. 6, and a plate-spring cover 361.

As illustrated in FIG. 4, the output-shaft-side-transmission component 331 used as the first transmission component includes the above-described pinion-mobile-side-helical spline 35, on the inner surface of the component 331, which is engaged to the output-shaft-side-helical spline 21. Moreover, the output-shaft-side-transmission component 331 includes nail portions 331c on a surface portion being orthogonal with respect to a direction where an axis of the component 331 is extended. Each of the nail portions 331c is composed of a torque-transmission surface 331a which is protruded in the direction where the axis is extended, and a sliding surface 331b which is formed on an inclined surface of which height from the surface portion is gradually reduced from a position of the torque-transmission surface 331a. As illustrated in FIG. 4 according to Embodiment 1, four nail portions 331c are arranged around the axis and separated each other with a predetermined angle distance.

As illustrated in FIG. 5, the pinion-gear-side-transmission component 332 used as the second transmission component is integrally configured with the output-shaft-side-transmission component 331, and the component 332 includes nail portions 332c on a surface portion being orthogonal with respect to a direction where an axis of the component 332 is extended. Each of the nail portions 332c is composed of a torque-transmission surface 332a which is protruded in the direction where the axis of the nail portion 332c is extended, and a sliding surface 332b which is formed on an inclined surface of which height from the surface portion is gradually reduced from a position of the torque-transmission surface 332a. As illustrated in FIG. 5 according to Embodiment 1, four nail portions 332c are arranged around the axis and separated each other with a predetermined angle distance.

As illustrated in FIG. 6, the output-shaft-side-transmission component 331 and the pinion-gear-side-transmission component 332 are arranged in such a way that each of the nail portions 331c is faced to each of the nail portions 332c, and the torque-transmission surface 331a of each of the nail portions 331c of the output-shaft-side-transmission component 331 is contacted with the torque-transmission surface 332a of each of the nail portions 332c of the pinion-gear-side-transmission component 332, so that the output-shaft-side-transmission component 331 and the pinion-gear-side-transmission component 332 are configured in such a way that a rotational torque is transmitted from one of the transmission components to the other transmission component.

The plate spring 36 is inserted between an end surface in a shaft direction of the output-shaft-side-transmission component 331 and an inner wall of the plate-spring cover 361. The plate-spring cover 361 is integrally fixed to the clutch cover 32 by tightening an end edge of the clutch cover 32 to a groove portion 361a formed on an outer surface of the plate-spring cover 361. The plate spring 36, which is inserted between the plate-spring cover 361 and the output-shaft-side-transmission component 331, constantly presses the output-shaft-side-transmission component 331 by a predetermined initial load "Fk1" against a direction of the pinion-gear-side-transmission component 332.

The engine starter has a configuration in which a torque generated from the motor 10 is passed from the output-shaft-side-helical spline 21 provided on the output shaft 20 to the pinion-mobile-side-helical spline 35, and the torque is transmitted to the pinion-mobile component 30. Moreover, the torque, which is generated from the motor 10 and transmitted to the pinion-mobile-side-helical spline 35, is transmitted from the torque-transmission surface 331a of the output-shaft-side-transmission component 331 to the torque-transmission surface 332a of the pinion sear-side-transmission component 332, and then, the torque is transmitted to the pinion gear 34 via the clutch-outer portion 311, the clutch roller 313, and the clutch-inner portion 312 of the overrunning clutch 31. Moreover, the torque, which is generated from the motor 10 and transmitted to the pinion gear 34, is transmitted to the ring gear 100 of the engine, whereby the engine is started.

Figure 7:
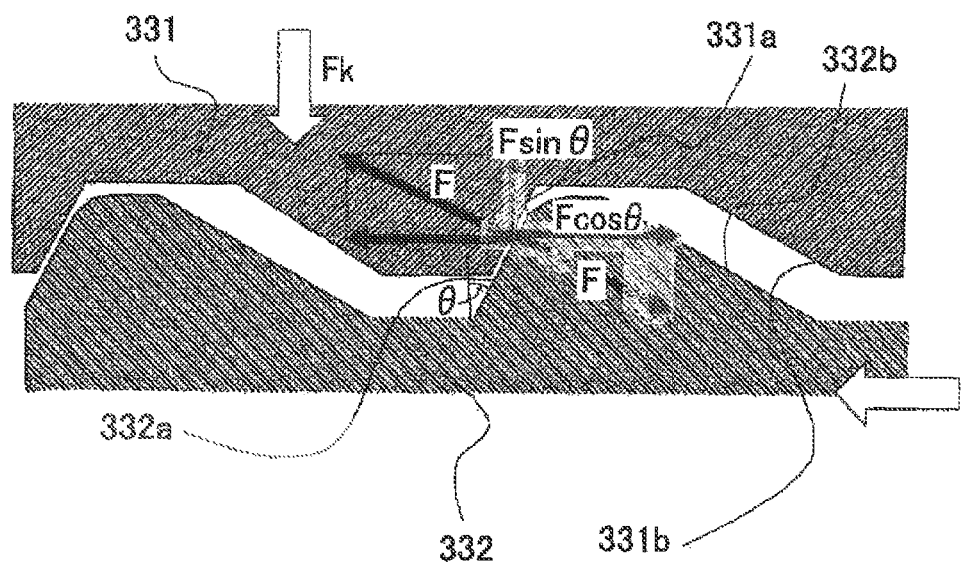
FIG. 7 is an explanatory diagram of a breaker mechanism of the engine starter according to Embodiment 1 of the present invention.

In contrast to the above-described operation, when a torque is generated in accordance with a reverse rotation of the engine, the torque, which is generated in accordance with the reverse rotation of the engine, is transmitted to the output shaft 20 via a passage being reverse to the above-described passage. An operation image of the breaking mechanism 33 at this time is illustrated in FIG. 7. In other words FIG. 7 is an explanatory diagram of a breaker mechanism of the engine starter according to Embodiment 1 of the present invention, and FIG. 7 indicates a relationship of forces which are applied to the output-shaft-side-transmission component 331 and the pinion-gear-side-transmission component 332 in the breaking mechanism 33 in a state where the torque is generated in accordance with the reverse rotation of the engine.

When the plate spring 36 is inserted between the output-shaft-side-transmission component 331 and the plate-spring cover 361 in FIG. 7, the plate spring 36 is set in such a way that the predetermined initial load Fk1, in a direction (hereinafter, referred to as axis direction) where an axis of the output-shaft-side-transmission component 331 is extended, is applied to the output-shaft-side-transmission component 331. Here, the predetermined initial load Fk1 is calculated by the following formula.

$$Fk1 = K \times S$$

In addition, a symbol "K" is a spring constant of the plate spring 36, and a symbol "S" is an initial amount of deformation of the plate spring 36.

When the ring gear 100 of the engine is reversely rotated and a torque "T" is applied to the pinion gear 34 and the overrunning clutch 31, a vertical force "F" is applied to the torque-transmission surface 331a and the torque-transmission surface 332a, which are contacted each other. Here, the torque-transmission surface 331a and the torque-transmission surface 332a are respectively inclined "θ" degree toward each of axes of the output-shaft-side-transmission component 331 and the pinion-gear-side-transmission component 332. Therefore, the torque T, which is generated in accordance with the reversal rotation of the engine, is actually generated as "Fx cosine θ", and torque T is transmitted from the pinion-gear-side-transmission component 332 to the output-shaft-side-transmission component 331 via the torque-transmission surfaces 331*a* and 332*a*. At this time, an axis-direction-reverse-force "FX sine θ" is applied to the torque-transmission surfaces 331*a* and 332*a*.

Here, when a relationship between the initial load Fk1 applied by the plate spring 36 and the axis-direction-reverse-force "FX sine θ" is represented by the following formula, the plate spring 36 is more pressed and deformed in comparison with the plate spring 36 on which an initial load is set.

$$Fk1 < F \times \sin \theta$$

Therefore, when the torque T is increased and the axis-direction-reverse-force "FX sine θ" is greater than the initial load Fk of the plate spring 36, the deformation of the spring 36 is increased.

Figure 8A:
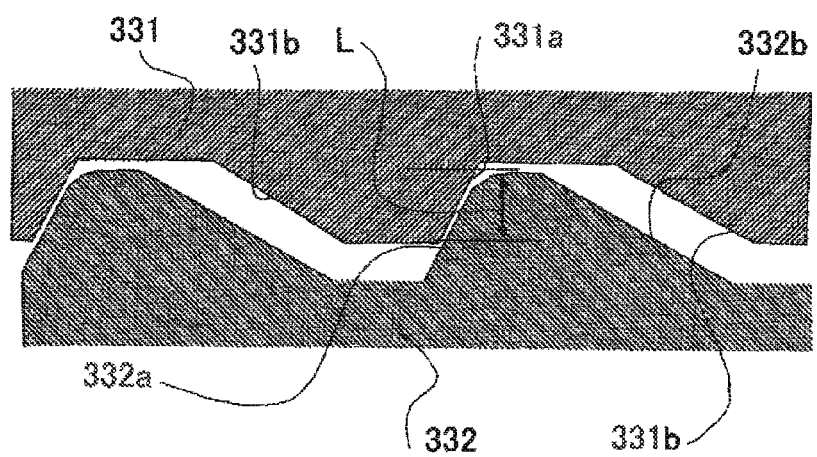
FIGS. 8A, 8B and 8C are operation images of the breaker mechanism of the engine starter according to Embodiment 1 of the present invention, with relative movement of elements indicated by arrow T.

FIG. 8 are operation images of the breaker mechanism of the engine starter according to Embodiment 1 of the present invention. FIG. 8A indicates a state in which the axis-direction-reverse-force "FX sine θ" is lower than the initial load Fk of the plate spring 36, and the torque, which is generated in accordance with the reversal rotation of the engine and transmitted from the ring gear 100 of the engine to the pinion gear 34, is transmitted from the pinion-gear-side-transmission component 332 to the output-shaft-side-transmission component 331.

When the torque T, which is generated in accordance with the reversal rotation of the engine, is greater than a predetermined value and the axis-direction-reverse-force "FX sine θ" is greater than initial load Fk of the plate spring 36, the plate spring 36 is pressed and deformed as described above. However, when the amount of deformation of the plate spring 36 is greater than a stroke L in the axis direction, on which the torque-transmission surface 331*a* and the torque-transmission surface 332*a* are engaged, the torque-transmission surface 331*a* of the output-shaft-side-transmission component 331 cannot be engaged to the torque-transmission surface 332*a* of the pinion-gear-side-transmission component 332, whereby the output-shaft-side-transmission component 331 and the pinion-gear-side-transmission component 332 are idled.

Figure 8B:
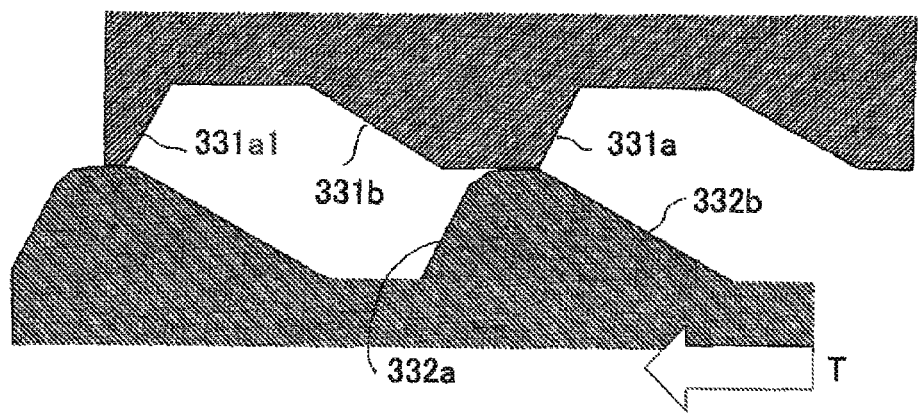

When the output-shaft-side-transmission component 331 and the pinion-gear-side-transmission component 332 are idled as illustrated in FIG. 8B, a load Fk2 caused by the plate spring 36 is calculated by the following formula.

$$Fk2 = K \times (S+L)$$

Moreover, when the amount of deformation of the plate spring 36 is reached to the stroke L, and a relationship between the load Fk2 of the plate spring 36 and the axis-direction-reverse-force "Fx sine θ" is represented by the following formula, the output-shaft-side-transmission component 331 and the pinion-gear-side-transmission component 332 are idled.

$$Fk2 < F \times \sin \theta$$

Figure 8C:
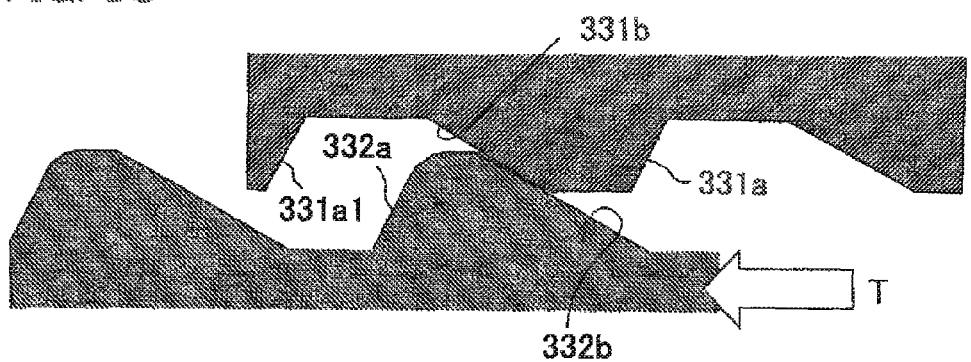

After the output-shaft-side-transmission component 331 and the pinion-gear-side-transmission component 332 start to idle as illustrated in FIG. 8B, the sliding surface 331*b* of the output-shaft-side-transmission component 331 and the sliding surface 332*b* of the pinion-gear-side-transmission component 332 are contacted and idled while the surfaces are slid each other as illustrated in FIG. 8C, and a next torque-transmission surface 331*a*1 is engaged to the torque-transmission surface 331*a* so as to transmit the torque.

Therefore, when the above-described idling operation is schematically described in FIG. 8, the output-shaft-side-transmission component 331 and the pinion-gear-side-transmission component 332 are idled until the next torque-transmission surface 331*a*1 of the output-shaft-side-transmission component 331 is contacted to the torque-transmission surface 332*a* of the pinion-gear-side-transmission component 332.

The idling time of the components is determined in accordance with a number of the nail portions 331*c* and 332*c*. Because four nail portions 331*c* and four nail portions 332*c* are respectively provided on the output-shaft-side-transmission component 331 and the pinion-gear-side-transmission component 332 in Embodiment 1 of the present invention, the torque is transmitted again after the components are idled at every 90 angle-degree. Therefore, if the torque T, which is generated in accordance with the reverse rotation of the engine, is greater than a predetermined value, the idling operation is repeated during predetermined time.

In addition, although the engine is reversely rotated and the torque is applied from the engine side to the pinion gear side in the above-described explanation, for example, when the pinion gear side is locked and the pinion gear engaged to the ring gear is locked, the output-shaft-side-transmission component 331 and the pinion-gear-side-transmission component 332 are idled as described above.

The nail portions are provided and spaced at every determined angle-degree as described above, whereby the idling time can be set in accordance with a number of the portions. Moreover, inclination angles of the sliding surfaces 331*b* and 332*b* can be arbitrarily set. For example, if a low angle-degree is set for the inclined surfaces, a frictional force is enhanced when the output-shaft-side-transmission component 331 and the pinion-gear-side-transmission component 332 are idled, and the frictional force is converted to thermal energy, so that the frictional force is converted into thermal energy, and an absorption amount of impact energy applied to the pinion gear is increased. Therefore, in this case, when a large impact is applied to the pinion gear, not only an effect of idling the components but also an effect of absorbing the impact can be obtained.

Moreover, at a time of starting the engine, if the axis-direction-reverse-force "FX sine θ", which is generated on the torque-transmission surfaces 331*a* and 332*a* in accordance with an impact torque caused by a pulsation of the engine, is greater than the initial load Fk1 of the plate spring 36 and less than the load Fk2 of the plate spring 36 when the deformation of the plate spring 36 reaches the stroke L, the torque-transmission surfaces 331*a* and 332*a* are only slid, and the output-shaft-side-transmission component 331 and the pinion-gear-side-transmission component 332 are not idled. Moreover, if the engine is pulsed at a time of cranking the engine, the plate spring 36 is deformed, whereby impact noise generated from the pinion gear and the ring gear can be reduced.

As described above, in the engine starter according to Embodiment 1 of the present invention, when the abnormal torque is generated from the ring gear side, the internal components of the pinion-mobile component 30 are idled in accordance with the torque impact which is received from the ring gear 100 when the pinion gear 34 is engaged to the ring gear 100 during the ring gear 100 is reversely rotated. In the configuration in which the internal components of the pinion-mobile component 30 are idled, the breaking mechanism 33, which can be idled, is provided at a position near the pinion gear 34, so that the internal components are idled before the torque impact is transmitted to the reduction gear 90, and damage is not caused on the helical spline 21, the helical spline 21 and the like, and moreover, the impact noise, which is generated when the pinion gear is clashed to the ring gear, can be reduced.

In addition, the components of the breaking mechanism 33 are idled not only when the ring gear is reversely rotated but also when the engine side is locked, so that destruction of an internal mechanism can be suppressed by the breaking mechanism 33 when an abnormal condition without the reversal rotation is caused.

In the engine starter according to Embodiment 1 of the present invention, for example, even when an excessive torque is generated in a case where the pinion gear is engaged to the pinion gear during the engine is loosely and reversely rotated, the gears are idled in the pinion-mobile component 30 so as to absorb the impact, so that the gears can be engaged even when the number of reversal revolutions is large.

Moreover, when a rotational force of the motor is encountered to a reverse-rotational force, the component is idled at a position near the pinion gear 34 at the pinion gear side, whereby an impact and an excessive torque can be absorbed, so that the pinion gear can be completely engaged to the pinion gear without damaging the helical spline or the like in a state where a control operation for breaking the rotation of the motor is not performed. Therefore, restart time can be reduced, and an integrated switch, by which the pinion gear is continuously pushed and the motor is continuously rotated, can be used, whereby a low cost and downsizing of the engine starter can be realized.

Moreover, the breaking mechanism 33 is provided on the outer surface of the helical spline of the pinion-mobile component 30 or the outer surface of the clutch-outer portion of the overrunning clutch 31. As described above, the breaking mechanism 33 is configured in parallel to the helical spline in the shaft direction, whereby the engine starter is not upsized, and an impact attenuator and an idling mechanism of the engine starter can be downsized.

Moreover, the torque is transmitted by the nail portions, and the load applied by the plate spring can be set in order to idle the components, so that a value of the idling torque, which cannot be set in a conventional engine starter, is easily set. In other words, the clutch roller 313 of the overrunning clutch 31 transmits the torque, which is caused when the engine is reversely rotated, or the torque, which is caused when the motor is rotated, in a case where the engine is rotated in a direction where power is transmitted. However, if the engine starter is configured in such a way that the impact torque is absorbed by the clutch roller 313, a frictional coefficient is not constant, and a variation of the torque is increased by secular changes. However, in the engine starter according to Embodiment 1 of the present invention, a variation of the idling torque, which is caused in accordance with a mass production of the engine starter, can be reduced. Moreover, a load for reducing a noise, which is caused at a time of cranking the engine, can be easily set as described above.

As described above, in the engine starter according to Embodiment 1 of the present invention, the torque is easily set by the downsized components, whereby the engine starter can be easily protect not only when the engine is reversely rotated but also when the gears are worn-out and locked each other. Moreover, the breaking mechanism 33 has a configuration in which the torque is transmitted by the nail portions, and the mechanism is configured at the outer surface side of the helical spline of the output-shaft-side-helical spline 21, and the overrunning clutch 31 and the breaking mechanism 33 are linked by the clutch cover 32, so that the engine starter is not upsized, and the stable idling operation and torque transmission, which are caused by the torque impact, can be performed.

In addition, the engine starter, in which the pinion gear and the ring gear are engaged when the idling-stop operation is performed and the ring gear is loosely rotated, is described in the above explanation. However, even when the gears are engaged after the idling-stop operation is performed and the ring gear is completely stopped, or even when the engine starter used for a car, in which an idling-stop mechanism is not installed, is used, an abnormal impact torque is generated when the gears are worn-out and locked and the rotation of the motor is started, so that an effect is obtained by applying the engine starter of the present invention.

Embodiment 2

In the engine starter according to Embodiment 1, the breaking mechanism 33 is arranged at a position, which is nearer to the motor 10 than to the overrunning clutch 31 in the pinion-mobile component 30, whereas in an engine starter according to Embodiment 2, a breaking mechanism 33 is arranged at a position, which is nearer to a pinion gear 34 than to an overrunning clutch 31.

Figure 9:
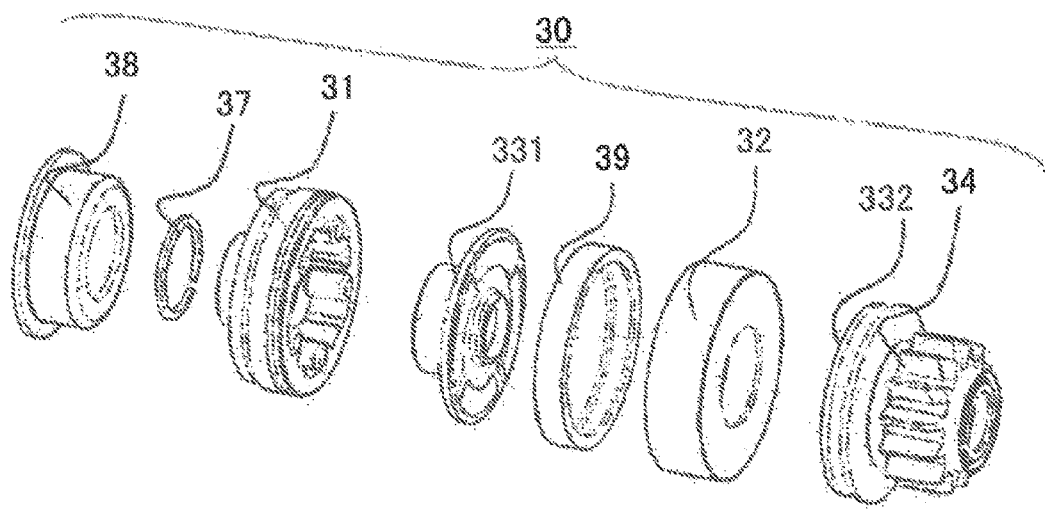
FIG. 9 is an exploded oblique view illustrating a pinion-mobile component of an engine starter according to Embodiment 2 of the present invention.

FIG. 9 is an exploded oblique view illustrating a pinion-mobile component of an engine starter according to Embodiment 2 of the present invention. In FIG. 9, a pinion-mobile component 30 includes, by the similar way in Embodiment 1, the overrunning clutch 31, a clutch cover 32, the breaking mechanism 33, which breaks a transmission of a torque generated in accordance with a rotation of the motor when the torque is set in a predetermined condition with respect to a direction where the torque is transmitted, the pinion gear 34, a pinion-mobile-side-helical spline 35 which is linked to an output shaft 20 by a helical spline, a lever-engagement component 38 engaged to a lever, and a fixing component 37 of the lever-engagement component 38.

Moreover, the overrunning clutch 31 is composed of a clutch-outer portion 311, a clutch-inner portion 312, a clutch roller 313, and a clutch spring 314 for pushing the clutch roller 313.

Moreover, the overrunning clutch 31 includes a clutch-outer portion 311, a clutch-inner portion 312, a clutch roller 313, and a clutch spring 314 for pushing the clutch roller 313. The breaking mechanism 33 is composed of an output-shaft-side-transmission component 331 used as a first transmission component, a pinion-gear-side-transmission component 332 used as a second transmission component, and a spring component 39 corresponding to the plate spring 36 according to Embodiment 1. In Embodiment 2, the clutch cover 32 is used as the plate-spring cover 361 according to Embodiment 1.

Figure 10:
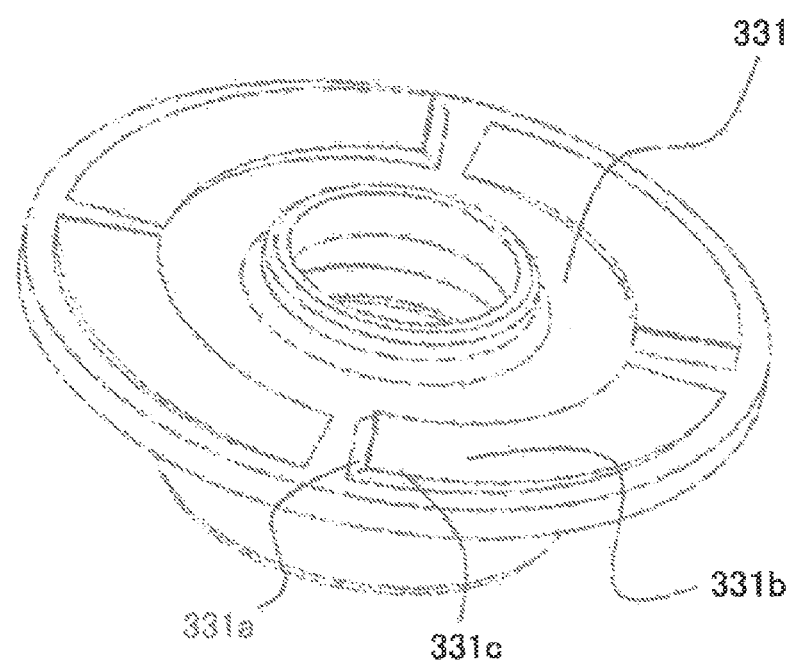
FIG. 10 is an oblique perspective view illustrating an output-shaft-side-transmission component the engine starter according to Embodiment 2 of the present invention.

FIG. 10 is an oblique perspective view illustrating an output-shaft-side-transmission component the engine starter according to Embodiment 2 of the present invention. In FIG. 10, the output-shaft-side-transmission component 331 used as the first transmission component is integrally configured with the clutch-inner portion 312 illustrated in FIG. 13. The output-shaft-side-transmission component 331 includes nail portions 331c on a surface portion being orthogonal with respect to a direction where an axis of the component 331 is extended.

Each of the nail portions 331c is composed of a torque-transmission surface 331a which is protruded in the direction where the axis is extended, and a sliding surface 331b which is formed on an inclined surface of which height from the surface portion is gradually reduced from a position of the torque-transmission surface 331a. As illustrated in FIG. 10 according to Embodiment 2, four nail portions 331c are arranged around the axis and separated each other with a predetermined angle distance.

Figure 11:
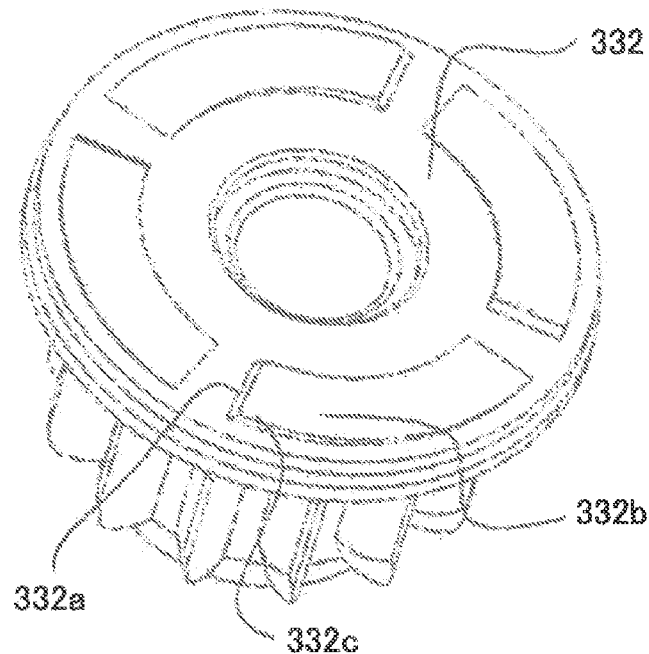
FIG. 11 is an oblique perspective view illustrating a pinion-gear-side-transmission component the engine starter according to Embodiment 2 of the present invention.

FIG. 11 is an oblique perspective view illustrating a pinion-gear-side-transmission component the engine starter according to Embodiment 2 of the present invention. In FIG. 11, the pinion-gear-side-transmission component 332 used as the second transmission component, which is faced to the output-shaft-side-transmission component 331 so as to be arranged, is configured at the pinion gear 34 side and includes nail portions 332c. Each of the nail portions 332c is composed of a torque-transmission surface 332a which is protruded in the direction where the axis of the nail portion 332c is extended, and a sliding surface 332b which is formed on an inclined surface of which height from the surface portion is gradually reduced from a position of the torque-transmission surface 332a. As illustrated in FIG. 11 according to Embodiment 2, four nail portions 332c are arranged around the axis and separated each other with a predetermined angle distance.

Figure 12:
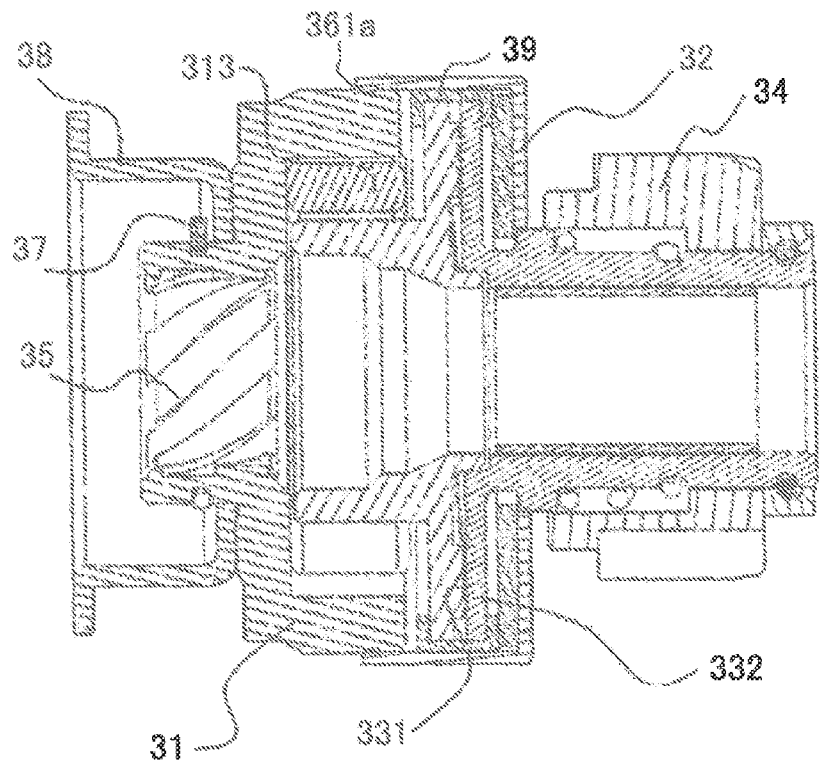
FIG. 12 is a cross-sectional view illustrating the pinion-mobile component of the engine starter according to Embodiment 2 of the present invention.

FIG. 12 is a cross-sectional view illustrating the pinion-mobile component of the engine starter according to Embodiment 2 of the present invention. In FIG. 12, the breaking mechanism 33 is covered by the spring component 39, and the clutch cover 32 is formed on an outer surface of the spring component 39. The clutch cover 32 is tightened to the groove portion 361a, which is provided on the clutch-outer portion 311, so as to be integrally fixed.

In the engine starter, which is configured as described above, according to Embodiment 2 of the present invention, the torque F is generated between the torque-transmission surface 331a of the output-shaft-side-transmission component 331 and the torque-transmission surface 332a of the output-shaft-side-transmission component 332, and the torque F is transmitted from pinion gear 34 in accordance with the impact which is generated by the reversal rotation of the ring gear as described in Embodiment 1.

Moreover, when the force "F×sine θ", which is generated at the time, in the axis direction is greater than the initial load Fk1 of the spring 36, which links the output-shaft-side-transmission component 331 and the pinion-gear-side-transmission component 332, the separation of the output-shaft-side-transmission component 331 and the pinion-gear-side-transmission component 332 is started in the axis direction, and when the force "F×sine θ" is greater than the load Fk2 which is generated in a case where the plate spring 36 is deformed, the components are idled, and the same operation, which is indicated in FIG. 8 according to Embodiment 1, is performed. The impact attenuator for the impact torque, which is configured as described above, is provided at a position near the pinion gear side, so that the impact attenuator sensitively reacts to the impact torque, and it can be simply realized that the impact is absorbed and the internal component are protected.

In addition, the engine starter, which is used in a case where the pinion gear and the ring gear are engaged when the ring gear is loosely rotated in accordance with the idling-stop operation, is described in Embodiment 1 and Embodiment 2. However, even when the gears are engaged after the idling-stop operation is performed and the ring gear is completely stopped, or even when the engine starter used for a car, in which an idling-stop mechanism is not installed, is used, an abnormal impact torque is generated when the gears are worn-out and locked and the rotation of the motor is started. Therefore, if an abnormal impact is applied to the pinion gear, for example, when the engine cannot be started after the engine starter is driven by a key operation, and the engine starter is driven again just after the key is turned off (so-called re-engaging state), the ring gear of engine starter side or the engine side is effectively prevented from being destroyed when the engine starter of the present invention is used.

Moreover, in Embodiment 1 and Embodiment 2, the engine starter may be configured in such a way that the shape of the torque-transmission surface of the output-shaft-side-transmission component is different from the shape of the torque-transmission surface of the pinion-gear-side-transmission component, in other words, the angle of the torque transmitting side is different from the angle of the torque non-transmitting side.

Moreover, in Embodiment 1 and Embodiment 2, an initial load, which is applied by the plate spring and presses the pair of transmission components in the axis direction, is set as a load that doesn't break the transmission of the torque by the torque which is generated in the axis direction when output of the engine is increased at a normal start. When the engine starter is configured as described above, if the engine is pulsed at a time of cranking the engine, the plate spring 36 is deformed with respect to the impact torque for absorbing the clash, whereby impact noise generated from the pinion gear and the ring gear can be reduced.

In the above-described engine starter according to each of embodiments of the present invention, the following components of the invention are crystallized.

(1). An engine starter comprising: a motor; a pinion-mobile component that includes a pinion gear, which can be engaged to a ring gear provided at an engine side, and is formed in such a way that the pinion-mobile component is linked to an output shaft of the motor by a helical spline and can be slid in an axis direction of the shaft; and a solenoid switch that includes a pushing mechanism for shifting the pinion-mobile component to a position where the pinion-gear is engaged to the ring gear; and a switch for passing or cutting off an electric current supplied to the motor; wherein the pinion-mobile component includes; an overrunning clutch which is idled when the pinion gear, which is engaged to the ring gear, is driven by the engine via the ring gear so as to be rotated at a rotational speed which is higher than a rotational speed of the output shaft; and a breaking mechanism in which the overrunning clutch breaks a transmission of a torque, which is generated in accordance with a rotation of the motor and is transmitted to the ring gear, when a value of the torque is a predetermined condition value with respect to a direction where the torque is transmitted to the ring gear.

According to the configuration of the engine starter of the present invention, the engine starter includes a mechanism, at the pinion-mobile component, which breaks a transmission of an abnormal torque, in a direction where the torque is transmitted, when the abnormal torque is caused from the ring gear side, so that a gear and the mechanism in the engine starter can be protected from an abnormal impact.

(2). An engine starter as recited in the description (1), wherein the breaking mechanism includes a pair of transmission components which are faced to a surface being vertical with respect to an axis direction, and a spring component presses the pair of transmission components in the axis direction.

According to the configuration of the engine starter of the present invention, the breaking mechanism can be formed with a simple configuration.

(3). An engine starter as recited in the description (2), wherein the spring component is a plate spring, and is provided on an outer surface of a helical spline, which is formed on the pinion-mobile component, or on an outer surface of a clutch-inner portion of the overrunning clutch.

According to the configuration of the engine starter of the present invention, the engine starter is not upsized in the axis direction.

(4). An engine starter as recited in the description (2) or the description (3), wherein an initial load, which is applied by the plate spring and presses the pair of transmission components in the axis direction, is set as a load that doesn't break the transmission of the torque by the torque which is generated in the axis direction when the output of the engine is increased at a normal start condition.

According to the configuration of the engine starter of the present invention, if the engine is pulsed at a time of cranking the engine, the plate spring 36 is deformed with respect to the impact torque for absorbing the clash, whereby impact noise generated from the pinion gear and the ring gear can be reduced.

(5). An engine starter as recited in any one of the descriptions (2) through (4), wherein the pair of transmission components include torque-transmission surfaces which respectively have predetermined inclinations with respect to the surface being vertical in the axis direction.

According to the configuration of the engine starter of the present invention, the torque-transmission surfaces can be formed with a simple configuration.

(6). An engine starter as recited in the description (5), wherein the torque-transmission surfaces have shapes in which an angle-degree at a torque transmission side is different from an angle-degree at a torque non-transmission side.

According to the configuration of the engine starter of the present invention, for example, when the torque-transmission surfaces have gentle slopes, the frictional force is increased when the components are idled, and the frictional force is converted into thermal energy, so that an amount of absorbing impact energy is increased. Therefore, when a large impact is simply received, there are effects in which the components are idled and the impact is absorbed.

(7). An engine starter as recited in the description (5) or the description (6), wherein a plurality of the torque-transmission surfaces are arranged in a rotational direction.

According to the configuration of the engine starter of the present invention, the idling time can be easily set.

(8). An engine starter as recited in any one of the descriptions (1) through (7), wherein the engine starter activates the pushing mechanism and the switch, whereby the engine is restarted during a deceleration period in a process where the engine is stopped; and the solenoid switch is configured in such a way that one coil for activating the pushing mechanism and the switch is formed, and the pinion gear is pushed in a process where a plunger of the pushing mechanism is pulled into the coil, and moreover, when the plunger is more pulled into the coil, a main circuit of the motor is closed so as to restart the motor.

According to the configuration of the engine starter of the present invention, even when the engine is r loosely and reversely rotated with the large number of rotations and the large impact force is caused, the pinion gear and the ring gear can be engaged, and even when an abnormal lock phenomenon is caused, the starter can be protected. Moreover, it is not required that the pinion-pushing operation and the motor-rotating operation are independently controlled, and it can be realized that the engine can be rapidly restarted with a low cost.

In addition, in the scope of the present invention, it is possible that each of embodiments is freely combined, or each of embodiments is suitably modified or omitted.

What is claimed is:

1. An engine starter comprising:
a motor;
a pinion-mobile component that includes a pinion gear, which can be engaged to a ring gear provided at an engine side, and is formed in such a way that the pinion-mobile component is linked to an output shaft of the motor by a helical spline and can be slid in an axis direction of the output shaft; and
a solenoid switch that includes:
a pushing mechanism for shifting the pinion-mobile component to a position where the pinion-gear is engaged to the ring gear; and
a switch for passing or cutting off an electric current supplied to the motor; wherein
the pinion-mobile component includes an overrunning clutch and a breaking mechanism;
the overrunning clutch which is idled when the pinion gear, which is engaged to the ring gear, is driven by the engine via the ring gear so as to be rotated at a rotational speed which is higher than a rotational speed of the output shaft; and
the breaking mechanism in which the overrunning clutch breaks a transmission of a torque, which is generated in accordance with a rotation of the motor and is transmitted to the ring gear, when a value of the torque is a predetermined condition value with respect to a direction where the torque is transmitted to the ring gear, wherein
the breaking mechanism includes a pair of transmission components which are faced to a surface being vertical with respect to an axis direction, and a spring component presses the pair of transmission components in the axis direction, and
the spring component is a plate spring, and is provided on an outer surface of a helical spline, which is formed on the pinion-mobile component, or on an outer surface of a clutch-inner portion of the overrunning clutch, wherein
an initial load, which is applied by the plate spring and presses the pair of transmission components in the axis direction, is set as a load that doesn't break the transmission of the torque by the torque which is generated in the axis direction when the output of the engine is increased at a normal start condition,
the pair of transmission components include torque-transmission surfaces which respectively have predetermined inclinations with respect to the surface being vertical in the axis direction, and
the torque-transmission surfaces have shapes in which an angle-degree at a torque non-transmission side is as an angle more gently sloping than an angle-degree at torque transmission side.

2. An engine starter as recited in claim 1, wherein a plurality of the torque-transmission surfaces are arranged in a rotational direction.

3. An engine starter as recited in claim 1, wherein
the engine starter activates the pushing mechanism and the switch, whereby the engine is restarted during a deceleration period in a process where the engine is stopped; and
the solenoid switch is configured in such a way that one coil for activating the pushing mechanism and the switch is formed, and the pinion gear is pushed in a process where a plunger of the pushing mechanism is pulled into the coil, and moreover, when the plunger is more pulled into the coil, a main circuit of the motor is closed so as to restart the motor.

* * * * *